United States Patent
Kryger

(10) Patent No.: US 11,988,304 B2
(45) Date of Patent: May 21, 2024

(54) TUBULAR ELEMENTS WITH ADHESIVE JOINT, METHOD OF JOINING TUBULAR ELEMENTS THEREOF

(71) Applicant: 3M INNOVATIVE PROPERTIES COMPANY, St. Paul, MN (US)

(72) Inventor: Matthew J. Kryger, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/280,026

(22) PCT Filed: Sep. 23, 2019

(86) PCT No.: PCT/IB2019/058044
§ 371 (c)(1),
(2) Date: Mar. 25, 2021

(87) PCT Pub. No.: WO2020/065495
PCT Pub. Date: Apr. 2, 2020

(65) Prior Publication Data
US 2022/0057025 A1    Feb. 24, 2022

Related U.S. Application Data

(60) Provisional application No. 62/738,377, filed on Sep. 28, 2018.

(51) Int. Cl.
*C09J 5/06* (2006.01)
*F16L 13/10* (2006.01)
*F16L 13/11* (2006.01)

(52) U.S. Cl.
CPC ............ *F16L 13/103* (2013.01); *C09J 5/06* (2013.01); *F16L 13/11* (2013.01)

(58) Field of Classification Search
CPC ......... F16L 13/10; F16L 13/103; F16L 13/11; F16L 13/116; C09J 5/06
See application file for complete search history.

(56) References Cited

U.S. PATENT DOCUMENTS

| | | | | |
|---|---|---|---|---|
| 2,312,579 | A | * | 3/1943 | Joseph .................... F16L 13/10 264/262 |
| 3,496,250 | A | | 2/1970 | Czerwinski |
| 3,498,866 | A | | 3/1970 | Kilbane |
| 3,828,412 | A | * | 8/1974 | Dreksler ............... F16B 11/008 29/890.035 |

(Continued)

FOREIGN PATENT DOCUMENTS

| | | |
|---|---|---|
| EP | 0138465 | 4/1985 |
| EP | 0193068 | 9/1986 |

(Continued)

OTHER PUBLICATIONS

International Search Report for PCT International Application No. PCT/IB2019/058044, mailed on Nov. 6, 2019, 5 pages.

*Primary Examiner* — David Bochna

(57) ABSTRACT

Apparatus and method for joining two tubular elements (14, 22) at a joint using an adhesive that is non-flowable at ambient temperatures but flowable at an elevated temperature. A ring (12) of uncured, non-flowable adhesive is placed around the male end of a male (14)/female (22) pipe interface. Upon exposure to elevated temperatures, the ring (12) melts and flows down into the interface, and cures.

16 Claims, 4 Drawing Sheets

(56) References Cited

U.S. PATENT DOCUMENTS

| | | | |
|---|---|---|---|
| 3,877,518 A * | 4/1975 | Dreksler | F16L 13/103 285/134.1 |
| 3,937,641 A * | 2/1976 | Kushner | F16L 13/103 285/422 |
| 4,196,923 A * | 4/1980 | Zimmerli | F16L 13/103 285/422 |
| 4,259,812 A | 4/1981 | Adell | |
| 4,546,155 A | 10/1985 | Hirose | |
| 5,077,376 A | 12/1991 | Dooley | |
| 5,430,112 A | 7/1995 | Sakata | |
| 5,498,096 A | 3/1996 | Johnson | |
| 5,707,702 A | 1/1998 | Brady, Jr. | |
| 6,004,417 A * | 12/1999 | Roesch | F16L 13/103 156/305 |
| 9,039,854 B2 * | 5/2015 | Ferrari | F16L 13/106 156/158 |
| 2006/0138772 A1 * | 6/2006 | Galante | F16L 13/103 285/249 |
| 2006/0191623 A1 * | 8/2006 | Lutz | F16L 13/103 156/293 |
| 2006/0214418 A1 * | 9/2006 | Pascuzzi | F16L 13/103 156/296 |
| 2009/0090454 A1 * | 4/2009 | Lutz | F16L 13/103 156/326 |
| 2011/0094992 A1 * | 4/2011 | Bilcai | F28F 9/26 156/275.3 |
| 2013/0183106 A1 * | 7/2013 | Mackle | F16L 13/103 156/158 |
| 2015/0219254 A1 * | 8/2015 | Lee | F16L 13/116 285/294.1 |
| 2015/0314550 A1 * | 11/2015 | Goto | C09J 5/06 428/34.7 |
| 2017/0045068 A1 * | 2/2017 | Sikorski | F16L 13/103 |
| 2021/0302079 A1 * | 9/2021 | Bryant | F16L 13/103 |

FOREIGN PATENT DOCUMENTS

| | | |
|---|---|---|
| GB | 1121196 | 7/1968 |
| IN | 206329 | 7/2007 |
| JP | S57-046810 | 3/1982 |
| JP | 2010-127426 | 6/2010 |

* cited by examiner

TUBULAR ELEMENTS WITH ADHESIVE JOINT, METHOD OF JOINING TUBULAR ELEMENTS THEREOF

BACKGROUND

Conventionally, in the heat exchanger industry, pipes are joined together using a process called brazing. Brazing is a pipe bonding process where metal objects are joined together by melting and flowing a filler metal into a joint. Typically, the filler metal has a lower melting point than the metals it is joining. This process is done at elevated temperatures (on the order of several hundred degrees Celsius). Skilled labor is needed to hand apply the brazing material at manufacturers that manually assemble heat exchangers. This production process often results in joined metal pipes with leaks and pinhole defects due to the manual nature of the process. Repair and rework is often necessary to ensure a proper joint of high quality. Alternatively, larger manufacturers have moved to an automated assembly process where the brazing metal is preapplied to the pipes being joined, but quality remains an issue.

To address issues associated with traditional brazing methods, the industry has looked at using liquid adhesives, including epoxies, to join pipes for heat exchanger applications. Liquid adhesives are messy and difficult to apply consistently and typically must be applied immediately prior to bonding. The use of epoxy-based tapes has also previously been explored as potential brazing replacement materials. The use of tapes may result in voids (if tape sections to not abut properly) or varying thicknesses (if tape sections overlap) and introduce issues associated with assembly operations, as it may be difficult to insert male pipe into female sections due to the inclusion of tape.

SUMMARY

A method of joining two pipes by pre-applying a ring of uncured adhesive to a pipe. The ring uncured adhesive is non-flowable at ambient temperatures. A male pipe end proximate the ring of uncured adhesive is mated with another pipe (female end). The resulting assembly is heated above a temperature at which the uncured adhesive becomes flowable, and gravity and/or capillary activity pulls the flowable adhesive into radial clearances between or proximate to contact points of the male and female members.

DETAILED DESCRIPTION

Figure 1:
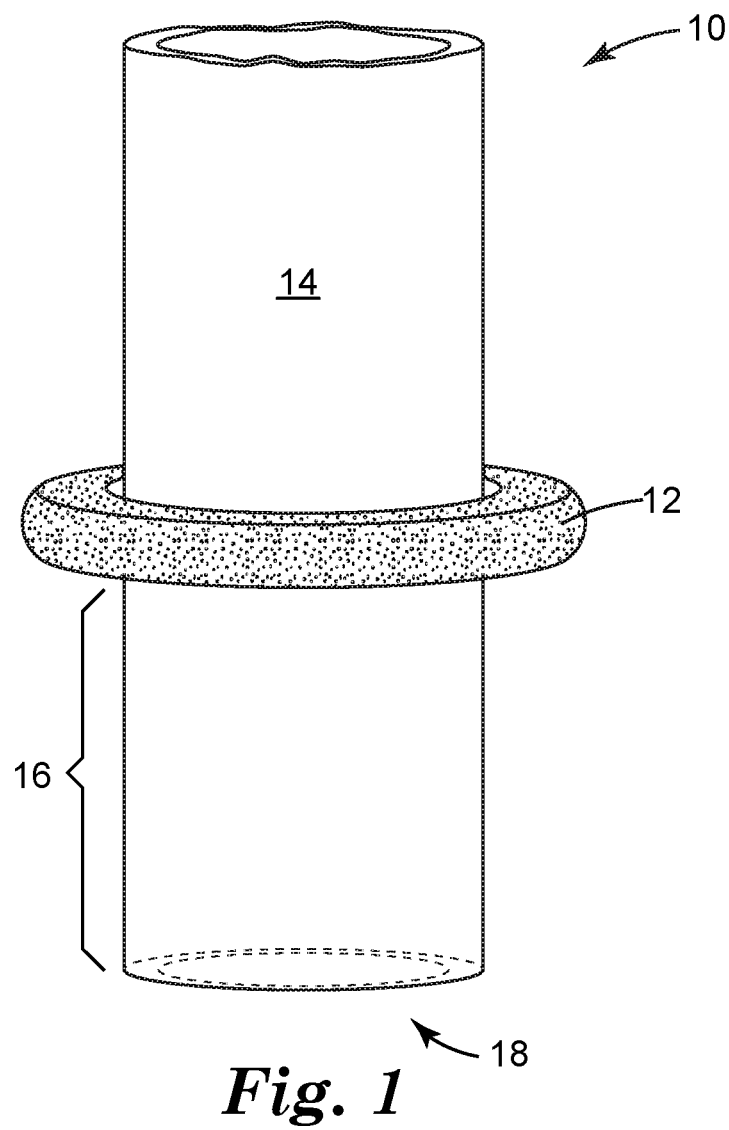
FIG. 1 is a drawing of a tubular element with a ring of uncured adhesive.

FIG. 1 shows pipe assembly 10, which includes tubular element 14, which is a pipe that would hold liquids, steam, or gasses under pressure. The pipe may be used in a heat exchanger-type application, where the pipe would be required to contain high temperature combinations of liquids and gasses. Tubular element 14 includes male end 16, which includes opening 18. Opening 18 may be of any suitable diameter. Typically, in the heat exchanger industry, the diameter of pipes that could be preferentially joined using techniques described herein are between about ⅛ inch to 1 inch, with diameters between ¼ inch and ⅝ inch being most common. The tubular element may be of any suitable length, and may be pre- or post-formed into suitable shapes. The pipe may be any suitable material, but is preferentially a metal typically used in the heat exchanger industry, such as aluminum or copper. A ring of uncured adhesive 12 loops around the exterior diameter of tubular element 14's exterior surface, at a location proximate to male end 16.

The ring of uncured adhesive 12 is, at ambient temperatures, unreacted and non-flowable. In some embodiments it is further non-tacky and non-brittle at ambient temperatures. Ambient temperatures include temperatures the assembly 10 would typically encounter during handling and storage, before it is intended to be permanently joined with another tubular element. For example, temperatures typically associated with storing and transporting assembly 10 would be considered ambient temperatures. In one embodiment, ambient temperatures include temperatures up to about 40 degrees Celsius. Though shown in a continuous ring, the term "ring" as used herein is used to connote regular deposits of unreacted, non-flowable adhesive around the exterior surface of pipe to be joined. Though shown in the figures as a ring on the exterior surface of a male end of a pipe to be joined, in other embodiments the ring may exist on the inside surface of a female end to be joined. In the embodiment shown in FIG. 1, the ring is a continuous ring, but other rings of discontinuous uncured epoxy, e.g., dotting the exterior surface to loosely form a ring, are also possible. "Non-flowable" means the uncured adhesive ring 12 maintains its geometric form as a ring, and though the ring may be malleable or soft at some ambient temperatures, it will not significantly deform nor flow at such temperatures. At ambient temperatures, the ring of uncured adhesive 12 remains as an unreacted solid ring for an extended, indefinite time period. In some embodiments, this extended period may mean up to 1 year, up to 2 years, or in some cases up to 5 years depending on how the ring is stored and the particular formulation of the adhesive.

Uncured adhesive ring 12, above a flow activation temperature, melts and exhibits flow characteristics associated with lower viscosity materials. For example, in FIG. 1, above a flow activation temperature, uncured adhesive ring 12 would being to flow down the exterior surface of tubular element 14, in the direction of gravity. The melted adhesive ideally may remain in a flowable state for a pot life up to 24 hours if the temperature is maintained at an intermediate level, just above the flow activation temperature, such that the significant cure of the adhesive is not occurring. At higher temperatures, the pot life is reduced. A good adhesive candidate may comprise an epoxy that has a pot life of at least 60 minutes at 100° C. A good adhesive candidate, when in the flow state, will still exhibit high enough viscosity that it does not flow out of and away from the bonded joints.

The now flowable adhesive, having spread into the radial clearances adjacent surfaces of the male and female joint through gravitational forces and capillary activity, and still being held at a temperature above the flow activation temperature, cures into a stable, homogenous material. Depending on characteristics of the selected adhesive, a full cure may be achieved by continuing to hold the adhesive at the temperature at which it flows for a sufficient period of time, or the process may be accelerated by increasing the temperature, which speeds the cure reaction.

In a preferred embodiment the uncured adhesive ring 12 comprises an epoxy, i.e. a curable epoxy resin having at least one polyepoxide resin and at least one curing agent; a toughener may be added to help with fatigue resistance. The curable epoxy resin compositions in one embodiment comprise one-part formulations that contain both an epoxy resin and amine curative mixed with the epoxy resin. The epoxy resin component included in the curable composition contains an epoxy resin that has at least two epoxy functional groups (i.e., oxirane groups) per molecule. As used herein, the term oxirane group refers to the following divalent group.

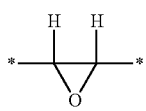

The asterisks denote a site of attachment of the oxirane group to another group. If an oxirane group is at the terminal position of the epoxy resin, the oxirane group is typically bonded to a hydrogen atom.

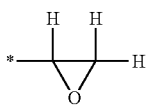 [SMILES: *C1CO1]

This terminal oxirane group is often part of a glycidyl group.

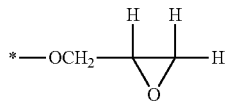

The epoxy resin has at least two oxirane groups per molecule. For example, the epoxy resin can have 2 to 10, 2 to 6, or 2 to 4 oxirane groups per molecule. The oxirane groups are usually part of a glycidyl group.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 grams/mole, in the range of 100 to 1,000 grams/mole, or in the range of 200 to 1,000 grams/mole.

Suitable epoxy resin compositions are typically a solid at ambient temperatures (e.g., under about 40° C.). In most embodiments, the epoxy resin is a glycidyl ether. Exemplary glycidyl ethers can be of Formula (I).

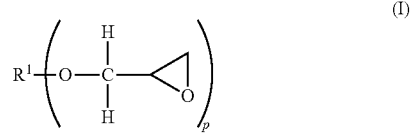

In Formula (I), group $R^1$ is a p-valent group that is aromatic, aliphatic, or a combination thereof. Group $R^1$ can be linear, branched, cyclic, or a combination thereof. Group $R^1$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 2, p is often an integer in the range of 2 to 10, in the range of 2 to 6, or in the range of 2 to 4.

In some embodiments, the epoxy resin is a polyglycidyl ether of a polyhydric phenol, such as polyglycidyl ethers of bisphenol A, bisphenol F, bisphenol AD, catechol, and resorcinol. In some embodiments, the epoxy resin is a reaction product of a polyhydric alcohol with epichlorohydrin. Exemplary polyhydric alcohols include butanediol, polyethylene glycol, and glycerin. In some embodiments, the epoxy resin is an epoxidised (poly)olefinic resin, epoxidised phenolic novolac resin, epoxidised cresol novolac resin, and cycloaliphatic epoxy resin. In some embodiments, the epoxy resin is a glycidyl ether ester, such as that which can be obtained by reacting a hydroxycarboxylic acid with epichlorohydrin, or a polyglycidyl ester, such as that which can be obtained by reacting a polycarboxylic acid with epichlorohydrin. In some embodiments, the epoxy resin is a urethane-modified epoxy resin. Various combinations of two or more epoxy resins can be used if desired.

In some exemplary epoxy resins of Formula (I), the variable p is equal to 2 (i.e., the epoxy resin is a diglycidyl ether) and $R^1$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene or biphenylene. Group $R^1$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (I) are diglycidyl ethers where $R^1$ includes (a) an arylene group or (b) an arylene group in combination with an alkylene, heteroalkylene, or both. Group $R^1$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 1510, EPON 1310, EPON 828, EPON 872, EPON 1001, EPON 1004, and EPON 2004) from Momentive Specialty Chemicals, Inc. (Columbus, OH), those available under the trade designation DER (e.g., DER 331, DER 332, DER 336, and DER 439) from Olin Epoxy Co. (St. Louis, MO), and those available under the trade designation EPICLON (e.g., EPICLON 850) from Dainippon Ink and Chemicals, Inc. (Parsippany, NJ). Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Olin Epoxy Co. (St. Louis, MO), those available under the trade designation EPICLON (e.g., EPICLON 830) from Dainippon Ink and Chemicals, Inc. (Parsippany, NJ), and those available under the trade designation ARALDITE (e.g., ARALDITE 281) from Huntsman Corporation (The Woodlands, TX).

Other epoxy resins of Formula (I) are diglycidyl ethers of a poly(alkylene oxide) diol. These epoxy resins also can be referred to as diglycidyl ethers of a poly(alkylene glycol) diol. The variable p is equal to 2 and $R^1$ is a heteroalkylene having oxygen heteroatoms. The poly(alkylene glycol) portion can be a copolymer or homopolymer and often include alkylene units having 1 to 4 carbon atoms. Examples include, but are not limited to, diglycidyl ethers of poly (ethylene oxide) diol, diglycidyl ethers of poly(propylene oxide) diol, and diglycidyl ethers of poly(tetramethylene oxide) diol. Epoxy resins of this type are commercially available from Polysciences, Inc. (Warrington, PA) such as those derived from a poly(ethylene oxide) diol or from a poly(propylene oxide) diol having a weight average molecular weight of about 400 grams/mole, about 600 grams/mole, or about 1000 grams/mole.

Still other epoxy resins of Formula (I) are diglycidyl ethers of an alkane diol (R' is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion Specialty Chemicals, Inc. (Columbus, OH) and under the trade designation EPALLOY (e.g., EPALLOY 5001) from CVC Thermoset Specialties (Moorestown, NJ).

For some applications, the epoxy resins chosen for use in may include novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured coating compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP1179, ARALDITE EPN 1138) from Huntsman Corporation (The Woodlands, TX) under the trade designation EPALLOY (e.g., EPALLOY 8230) from CVC Thermoset Specialties (Moorestown, NJ), and under the trade designation DEN (e.g., DEN 424 and DEN 431) from Olin Epoxy Co. (St. Louis, MO).

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co. (Midland, MI) under the trade designation DER 580).

The epoxy resin component is often a mixture of materials. For example, the epoxy resins can be selected to be a mixture that provides the desired viscosity or flow characteristics prior to curing. For example, within the epoxy resin may be reactive diluents that include monofunctional or certain multifunctional epoxy resins. The reactive diluent should have a viscosity which is lower than that of the epoxy resin having at least two epoxy groups. Ordinarily, the reactive diluent should have a viscosity less than 250 mPa·s (cPs). The reactive diluent tends to lower the viscosity of the epoxy resin composition and often has either a branched backbone that is saturated or a cyclic backbone that is saturated or unsaturated. Preferred reactive diluents have only one functional group (i.e., oxirane group) such as various monoglycidyl ethers. Some exemplary monofunctional epoxy resins include, but are not limited to, those with an alkyl group having 6 to 28 carbon atoms, such as (C6-C28)alkyl glycidyl ethers, (C6-C28)fatty acid glycidyl esters, (C6-C28)alkylphenol glycidyl ethers, and combinations thereof. In the event a monofunctional epoxy resin is the reactive diluent, such monofunctional epoxy resin should be employed in an amount of up to 50 parts based on the total of the epoxy resin component.

In some embodiments, the curable compositions typically include at least 20 weight percent (wt-%), or at least 25 wt-%, epoxy resin component, based on a total weight of the curable composition. If lower levels are used, the cured composition may not contain enough polymeric material (e.g., epoxy resin) to provide desired bonding characteristics. In some embodiments, the curable compositions include up to 90 wt-%, or up to 75 wt-%, epoxy resin component, based on a total weight of the curable composition.

Some preferred epoxy resin compositions of the present disclosure include at least one nitrogen-containing curative. Such curatives are typically of the heat activated class. In certain embodiments, the nitrogen-containing curative is capable of activation at temperatures at or above 100° C. to effect the thermal curing of the epoxy resin. Suitable nitrogen-containing curatives are typically a solid at room temperature, and not soluble in the epoxy resin composition at room temperature.

As used herein, the term "nitrogen-containing curative" refers to any nitrogen-containing compound that causes the curing of the resin composition. The term does not imply or suggest a certain mechanism or reaction for curing. The nitrogen-containing curative can directly react with the oxirane ring of the epoxy resin or can catalyze or accelerate the self-polymerization of the epoxy resin.

In certain embodiments, the curative used is dicyandiamide (DICY), a latent curing agent which forms crystals with a melting point of 207° C.-210° C. DICY can be commercially obtained under the trade name Amicure CG1200 from Evonik (Essen, Germany).

In certain embodiments, the nitrogen-containing curativess are amine-containing curatives. Some amine-containing curatives have at least two groups of formula —NR$^2$H, wherein R$^2$ is selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl or biphenyl group. Suitable alkylaryl groups can include the same aryl and alkyl groups discussed above.

The nitrogen-containing curative minus the at least two amino groups (i.e., the portion of the curative that is not an amino group) can be any suitable aromatic group, aliphatic group, or combination thereof.

Exemplary nitrogen-containing curatives for use herein include a reaction product of phthalic anhydride and an aliphatic polyamine, more particularly a reaction product of approximately equimolar proportions of phthalic acid and diethylamine triamine, as described in British Patent 1,121, 196 (Ciba Geigy AG). A curative of this type is available commercially from Ciba Geigy AG under the tradename CIBA HT 9506.

Yet another type of nitrogen-containing curative is a reaction product of: (i) a polyfunctional epoxy compound; (ii) an imidazole compound, such as 2-ethyl-4-methylimidazole; and (iii) phthalic anhydride. The polyfunctional epoxy compound may be a compound having two or more epoxy groups in the molecule as described in U.S. Pat. No. 4,546,155 (Hirose et al.). A curative of this type is commercially available from Ajinomoto Co. Inc. (Tokyo, Japan) under the tradename AJICURE PN-23, which is believed to be an adduct of EPON 828 (bisphenol type epoxy resin epoxy equivalent 184-194, commercially available from Hexion Specialty Chemicals, Inc. (Columbus, OH)), 2-ethyl-4-methylimidazole, and phthalic anhydride.

Other suitable nitrogen-containing curatives include the reaction product of a compound having one or more isocyanate groups in its molecule with a compound having at least one primary or secondary amino group in its molecule. Additional nitrogen-containing curatives include 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof, as well as products of triazine with isocyanuric acid, succinohydrazide, adipohydrazide, isophtholohydrazide, o-oxybenzohydrazide, salicylohydrazide, or a combination thereof.

Nitrogen-containing curativess are commercially available from sources such as Ajinomoto Co. Inc. (Tokyo, Japan) under the tradenames AMICURE MY-24, AMICURE GG-216 and AMICURE ATU CARBAMATE, from Hexion Specialty Chemicals, Inc. (Columbus, OH) under the tradename EPIKURE P-101, from T&K Toka (Chikumazawa, Miyoshi-Machi, Iruma-Gun, Saitama, Japan) under the tradenames FXR-1020, FXR-1081, and FXR-1121, from Shikoku (Marugame, Kagawa Prefecture, Japan) under the tradenames CUREDUCT P-2070 and P-2080, from Air Products and Chemicals (Allentown, PA) under the tradenames ANCAMINE 2441 and 2442, from AC Catalysts (Linden, NJ) under the tradenames TECHNICURE LC80 and LC100, and from Asahi Kasei Kogyo, K.K. (Japan) under the tradename NOVACURE HX-372.

Other nitrogen-containing curativess that may be suitable in some embodiments are those described in U.S. Pat. No. 5,077,376 (Dooley et al.) and U.S. Pat. No. 5,430,112 (Sakata et al.) referred to as "amine adduct latent accelerators." Other exemplary nitrogen-containing curatives are described, for example, in British Patent 1,121,196 (Ciba Geigy AG), European Patent Application No. 138465A (Ajinomoto Co.), and European Patent Application No. 193068A (Asahi Chemical).

In some embodiments, the curable epoxy resin compositions typically include at least 1 part, at least 2 parts, at least 3 parts, at least 4 parts, or at least 5 parts, of a nitrogen-containing curative, per 100 parts of the epoxy resin component. In some embodiments, the curable epoxy/thiol compositions typically include up to 45 parts, up to 40 parts, up to 35 parts, up to 30 parts, up to 25 parts, or up to 20 parts, of a nitrogen-containing curative, per 100 parts of the epoxy resin component. Various combinations of two or more nitrogen-containing curatives can be used if desired.

Optional Additives in the Epoxy Curable Composition

In addition to the epoxy resin component and the nitrogen-based curative, the curable composition can include various optional additives. One such optional additive is a toughening agent. Toughening agents can be added to provide the desired fatigue and performance properties. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the trade designations ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the trade designations KANE ACE (e.g., KANE ACE MX 157, KANE ACE MX 257, and KANE ACE MX 125) from Kaneka Corporation (Japan). They can also be obtained as predispersed blend within a room temperature solid epoxy, available under the trade designation KANE ACE (e.g., KANE ACE MX-184) from Kaneka Corporation (Japan)

Another class of polymeric toughening agents that are capable of forming, with the epoxide group-containing material, a rubbery phase on curing, are carboxyl-terminated butadiene acrylonitrile compounds. Commercially available carboxyl-terminated butadiene acrylonitrile compounds include those available under the trade designations HYCAR (e.g., HYCAR 1300X8, HYCAR 1300X13, and HYCAR 1300X17) from Lubrizol Advanced Materials, Inc. (Cleveland, OH) and under the trade designation PARALOID (e.g., PARALOID EXL-2650) from Dow Chemical (Midland, MI).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt-% to 40 wt-% of the total graft polymer, so that the polymerized thermoplastic portion constitutes from 5 wt-% to 60 wt-% of the graft polymer.

Still other polymeric toughening agents are polyether sulfones such as those commercially available from BASF (Florham Park, NJ) under the trade designation ULTRASON (e.g., ULTRASON E 2020 P SR MICRO).

The curable composition can additionally contain a non-reactive plasticizer to modify rheological properties. Commercially available plasticizers include those available under the trade designation BENZOFLEX 131 from Eastman Chemical (Kingsport, TN), JAYFLEX DINA available from ExxonMobil Chemical (Houston, TX), and PLASTOMOLL (e.g., diisononyl adipate) from BASF (Florham Park, NJ).

The curable composition optionally contains a flow control agent or thickener, to provide the desired rheological characteristics to the composition. Suitable flow control agents include fumed silica, such as treated fumed silica, available under the trade designation CAB-O-SIL TS 720, and untreated fumed silica available under the trade designation CAB-O-SIL M5, from Cabot Corp. (Alpharetta, GA).

In some embodiments, the curable composition optimally contains adhesion promoters to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The curable composition optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), pigments, flexibilizers, reactive diluents, non-reactive diluents, fluxing agents, soluble thermoplastic film formers, fire retardants, antistatic materials, and thermally and/or electrically conductive particles. Particulate fillers can be in the form of flakes, rods, spheres, and the like. Additives are typically added in amounts to produce the desired effect in the resulting adhesive.

The amount and type of such additives may be selected by one skilled in the art, depending on the intended end use of the composition.

In one embodiment, uncured adhesive ring 12 is an epoxy comprising the following formulation:

TABLE 1

Example Room Temperature Solid 1K Epoxy Formulation

| Raw Material | Formulation Percentage | Material Supplier |
| --- | --- | --- |
| EXPMX-184 | 40.14 | Kaneka Corporation (Japan) |
| Epon 828 | 21.31 | Hexion, Inc (Columbus, OH) |
| Epon 1004F | 20.40 | Hexion, Inc (Columbus, OH) |
| Dyanacoll S EP 1408 | 11.17 | Evonik Industries (Germany) |
| Amicure CG-1200 | 2.91 | Evonik Industries (Germany) |
| Udel PSU P-1800 | 2.85 | Solvay Specialty Polymers (Belgium) |
| Reactint Orange | 1.23 | Milliken & Company (Spartanburg, SC) |

The above epoxy is melt processable at elevated temperatures in order to form a ring. At 100° C., the uncured epoxy has a viscosity of the order of ~35,000 centipoise. Heating at higher temperatures lowers the application viscosity, although at higher temperatures initiation of cure is a concern. Held at a constant temperature of 100° C., the epoxy blend shows little change in viscosity over time over the course of one hour. The same epoxy blend, when heated to a temperature of 175° C. for 20 minutes is cured into a solid, intractable material which does not re-melt or flow.

Other adhesive chemistries may be utilized as the adhesive ring. Ideally such adhesive would exhibit the three windows noted above (solid and stable at ambient temperatures, flow characteristics above a second temperature, and cure conditions after a sufficient period of flow. Uncured adhesive ring 12 may also comprise cationically cured 1K epoxies, 1K heat activated polyurethanes, and other 1K thermosets such as cyanate esters or polyimides and the like. The ideal adhesive candidate bonds well to metal surfaces, does not crack, and may include tougheners.

Figure 2:
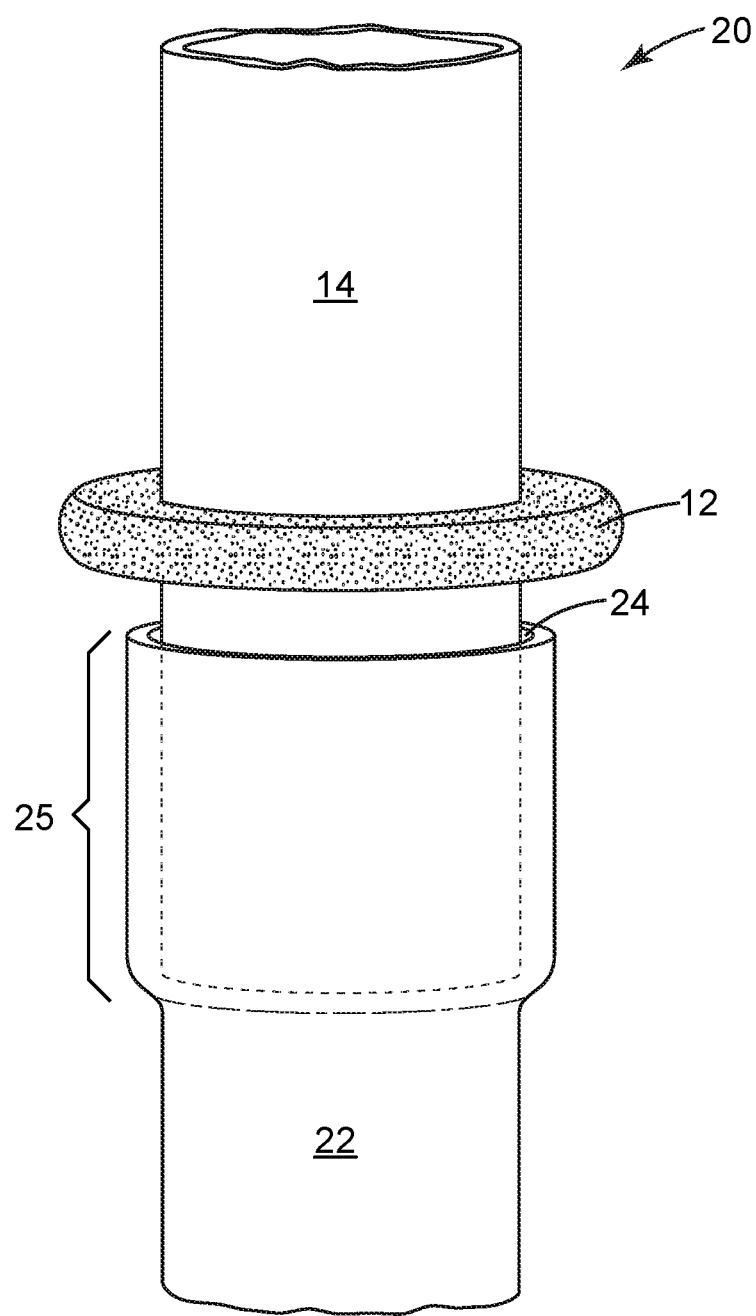
FIG. 2 is a drawing of a first tubular element partially inserted into a second tubular element before joining according to methods described herein.

FIG. 2 shows joint apparatus 20 at ambient temperatures, with two tubular elements assembled but not yet adhesively joined. Tubular element 14 and the uncured adhesive ring 12 are shown as in FIG. 1; male end 16 is inserted into female end 25 of tubular element 22. Very small radial clearances 24 would ideally exist between adjacent surfaces of the male and female ends, so as to allow the adhesive ring, upon melting, to flow down and penetrate the joint, thereby increasing surface area of the adhesive bond between tubular elements 14 and 22. In some embodiment, it is not necessary to have radial clearances, and the adhesive would not penetrate the joint, but would form a bond at the around the circumference of the end of female end 25.

Tubular element 14 and tubular element 22 may be the same type of metals (for example, copper or aluminum). Or the elements they may be dissimilar metals, for example tubular element 14 may be copper, and tubular element 22 may be aluminum. In other embodiments, either or both joined tubular elements may be other materials such as polycarbonate or glass, or, again, metal, or any suitable material compatible with the adhesive formulation selected. Intermixing among differing materials is, in some embodiments, an advantage of this adhesive joining technique over traditional brazing practices.

Figure 3:
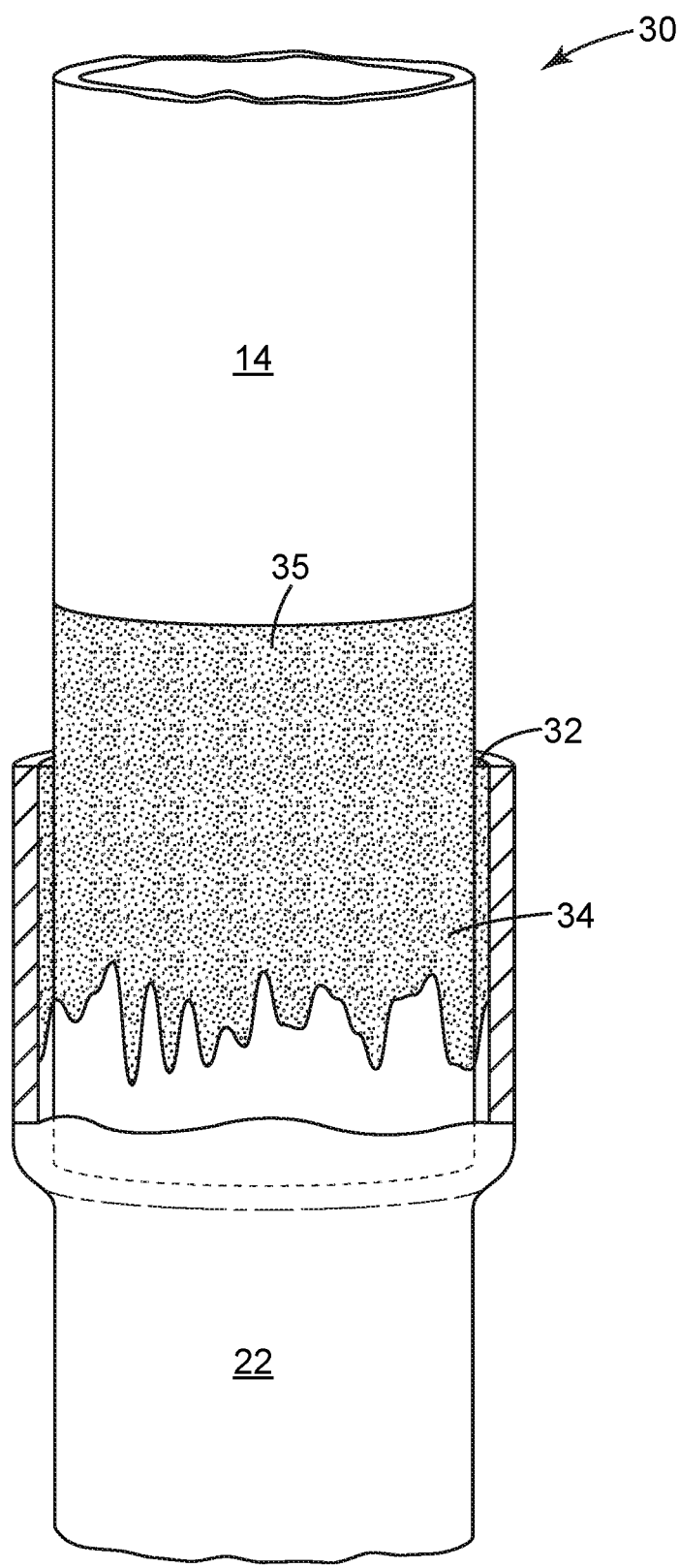
FIG. 3 is a drawing of a first tubular element partially inserted into a second tubular element after joining according to methods described herein.

FIG. 3 shows finished joint assembly 30, resulting from joint apparatus 20 as shown in FIG. 2. It includes tubular element 14 adhesively bonded with tubular element 22. The ring of uncured adhesive 12 (in reference to FIG. 2) is no longer present, because the joint assembly 30 has been elevated to a temperature at which the ring melted and flowed downward, in the direction of gravity, toward the female member, creating coating 35 on the exposed surface of male end of tubular element 14, a collar 32 of adhesive circumscribing the entry area of tubular element 14 into female end of tubular element 22, and sandwiched adhesive 34, which is adhesive that has flown into, with aid of gravity and/or capillary forces, and cured in radial clearances between adjacent surfaces of the male end of tubular element 14 and the female end of tubular element 22. Radial clearances refer to small gaps between the nested ends of the tubular elements. These gaps may exist naturally, as a result of a less than tight fit of the male and female ends, or such clearances may in some embodiments be engineered into the surfaces. For example, the interior surface of the female end may have a series of shallow grooves running parallel to the major axis of the tubular element. Such shallow grooves facilitate deep penetration of the flowing adhesive. As melted adhesive flows downward, it coats surfaces it encounters, leaving behind an adhesive coating that will eventually cure. In practice, an amount of adhesive that does not penetrate the radial clearances will flow downward along the exterior surface of the female end of tubular element 22, in some embodiments substantially coating the expanded pipe section (female end portion) of tubular element 22 (not shown in FIG. 3).

The resulting joint, upon curing and depending on the adhesive used, may be highly durable and long lasting—in some embodiments the resulting joint could last as long as joints created using traditional brazing methods.

Figure 4:
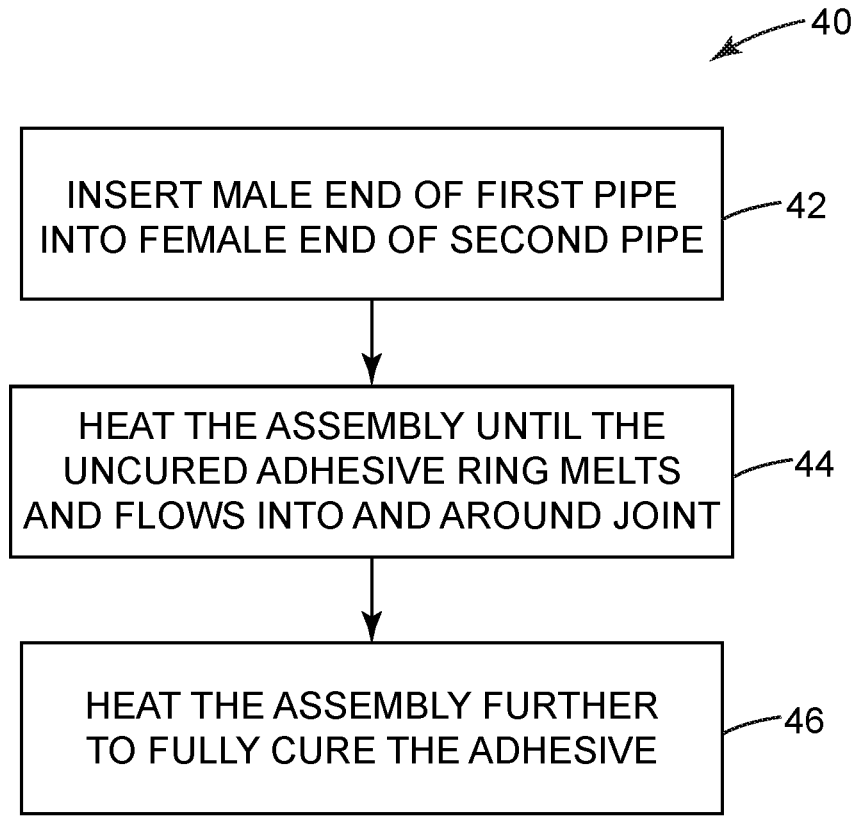
FIG. 4 is a flow chart of a method for assembling a joint.

FIG. 4 is a flow chart showing a method 40 of assembling the above-described joint. At step 42, a male end portion of a first tubular element is inserted into a female end portion of a second tubular element. Proximate the male end portion is a ring of uncured adhesive which is non-flowable at ambient temperatures. Next, at step 44, the assembly is heated until the uncured adhesive ring melts and flows into and around the end portions of the respective tubular elements. To facilitate such flow, the male member having the uncured adhesive ring is ideally positioned above the female member, such that gravity will pull the melted adhesive ring down into and around the joint. Alternatively, devices using centrifugal force could be utilized to similarly cause directional flow of the melted adhesive. Finally, at step 46, the assembly is further heated (or the existing level of heat is maintained) sufficient for the adhesive to crosslink and cure.

EXAMPLE

In order to demonstrate the feasibility of the methods described herein epoxy as a potential replacement for brazing material, a ring of the uncured material was formed by heating the epoxy blend specified in Table 1 until molten enough to flow (about 100° C.) into a premade rubber mold with a void of 2 inches×¼ inch×¹⁄₁₆ inch. After cooling, the premade strip of uncured, solid epoxy blend was demolded. It was then heated to ~40° C. using a handheld heat gun and formed by hand around the outer circumference of a pipe and cut to size to match the circumference of the pipe using a utility knife. The ends of the strip were then melded together through further heating with the heat gun and hand manipulation. The ring was then removed from the pipe as a free-standing ring (that is, it did not adhere to the outer surface of the pipe). The ring was then placed around the outer diameter of a separate copper pipe, to resemble the setup shown in FIG. 1. An end of the copper pipe proximate the ring (male) was then subsequently placed into the expanded end of a similar diameter aluminum pipe (female), to resemble the setup shown in FIG. 2. This construction was then heated in an oven at 175° C. for 20 minutes, with the female end situated underneath the ring to allow gravity to pull the melted, flowing epoxy down into the joint. During the heating process, the solid epoxy melted, then flowed down the outer surface of the copper pipe and around the outer surface of the aluminum pipe as well as into the radial clearances between the two pipes, resembling the setup shown in FIG. 3. After flowing, the epoxy material cured into an intractable solid (i.e., fully cured, will not re-melt) that bonded the two pipes together. The entire process of heating the epoxy ring to make it flow down into the joint, and then fully curing it took about 20 minutes in an isothermal oven at 175° C. The resulting joint resembled that shown in FIG. 3.

After the epoxy was fully cured and the assembly cooled, the joint was evaluated. It was observed that the epoxy blend had formed an intractable solid around the connected pipes. Gravity had pulled the melted epoxy downward from its initial placement as the epoxy ring, along the outer surface of the male member, over the connection point where the male member was inserted into the female pipe end, some of it down the outer surface of the female pipe, as well as into radial clearances between the outer surface of the male end of the first pipe and the inner surface of the female end of the second pipe. The bonded joint was further dissected to analyze the radial clearance between the male and female member by cutting it in half with a bandsaw in a direction parallel with the length of the pipe. It was noted that epoxy material had flowed into the radial clearances and cured between the outer surface of the male member the inner surface of the female member.

The invention claimed is:
1. A method of joining two tubular elements, comprising:
   providing a first tubular element having a male end portion and a second tubular element having a female end portion, wherein the male end portion and female end portion are both sized such that the male end portion may be inserted in the female end portion;

applying a ring of uncured adhesive on the male end portion of the first tubular element, wherein the uncured adhesive is non-flowable at ambient temperatures, wherein the uncured adhesive comprises an epoxy, wherein the epoxy comprises at least one polyepoxide resin, at least one curing agent, and a toughener;

inserting the male end portion of a first tubular element into the female end portion of a second tubular element, wherein the ring of uncured adhesive is positioned external of and adjacent the female end portion to form a tubular assembly;

heating the ring of uncured adhesive and the male end portion of the first tubular element and the female end portion of the second tubular element to a first temperature sufficient for the ring of uncured adhesive to become flowable adhesive and for the flowable adhesive to spread into radial clearances between the male end portion of the first tubular element and the female end portion of the second tubular element;

orienting the tubular assembly such that the first tubular element is vertical relative to the second tubular element, so as to allow gravity to pull the flowable adhesive from the position external of and adjacent the female end portion into the radial clearances between the male end portion and female end portion; and curing the flowable adhesive in the radial clearances between the adjacent male end surface of the first tubular element and the adjacent female end surface of the second tubular element by maintaining the male end portion of the first tubular element and the female end portion of the second tubular element, at a curing temperature for a length of time sufficient to cure the flowable adhesive.

2. The method of claim 1, wherein the first temperature is the same as the curing temperature.

3. The method of claim 1, wherein the first temperature is lower than the curing temperature.

4. The method of claim 1, wherein the inserted male end portion of the first tubular element includes an external surface and the female end portion of the second tubular element includes an internal surface, wherein the external surface and the internal surface of the face one another, and wherein gaps between the external surface and internal surface comprise the radial clearances.

5. The method of claim 4, wherein the uncured adhesive is pulled into the radial clearances by capillary action and gravity.

6. The method of claim 1, wherein the uncured adhesive is non-flowable at ambient temperatures.

7. The method of claim 1, wherein the uncured adhesive becomes flowable above about 40° C.

8. The method of claim 1, wherein the length of time sufficient for the uncured adhesive to cure comprises less than 30 minutes.

9. The method of claim 1, wherein the first tubular element and the second tubular element comprise metals.

10. The method of claim 9, wherein the first tubular element or the second tubular element comprise copper.

11. The method of claim 9, wherein the first tubular element or the second tubular element comprise aluminum.

12. The method of claim 9, wherein one of the tubular elements comprise copper, and the other tubular element comprises aluminum.

13. The method of claim 1, wherein the uncured resin has a pot life of at least 60 minutes at 100° C.

14. The method of claim 1, wherein the toughener comprises polymeric compounds having both a rubbery phase and a thermoplastic phase or compounds which are capable of forming with the epoxide resin both a rubbery phase and a thermoplastic phase on curing.

15. The method of claim 1, wherein the orienting step is after the heating step.

16. The method of claim 1, wherein the heating step is after the orientating step.

* * * * *